(12) United States Patent
Forstner et al.

(10) Patent No.: US 11,291,186 B2
(45) Date of Patent: Apr. 5, 2022

(54) FASTENING COMPOUND SYSTEM FOR A FOOT PROTECTOR

(71) Applicant: Megasus Horsetech GmbH, Fürstenfeld (AT)

(72) Inventors: Louisa Forstner, Fürstenfeld (AT); Karl Forstner, Fürstenfeld (AT)

(73) Assignee: Hippotech Megasus GmbH, Graz (AT)

( * ) Notice: Subject to any disclaimer, the term of this patent is extended or adjusted under 35 U.S.C. 154(b) by 146 days.

(21) Appl. No.: 16/300,632

(22) PCT Filed: May 5, 2017

(86) PCT No.: PCT/EP2017/060760
§ 371 (c)(1),
(2) Date: Nov. 12, 2018

(87) PCT Pub. No.: WO2017/194402
PCT Pub. Date: Nov. 16, 2017

(65) Prior Publication Data
US 2019/0208746 A1    Jul. 11, 2019

(30) Foreign Application Priority Data

May 12, 2016    (EP) .................................... 16169307

(51) Int. Cl.
*A01K 13/00*    (2006.01)
*A01L 3/00*    (2006.01)

(52) U.S. Cl.
CPC .............. *A01K 13/007* (2013.01); *A01L 3/00* (2013.01)

(58) Field of Classification Search
CPC ..... A01L 3/00; A01L 3/02; A01L 3/04; A01L 5/00

(Continued)

(56) References Cited

U.S. PATENT DOCUMENTS 172,150 A * 1/1876 Murphy .................... A01L 3/04
168/21
600,744 A * 3/1898 Rupert ...................... A01L 3/04
168/21

(Continued)

FOREIGN PATENT DOCUMENTS

DE    197 42 274 A1    3/1998
DE    197 53 120 A1    6/1998

(Continued)

OTHER PUBLICATIONS

English Translation of DE19753120A1 (Year: 1998).*
(Continued)

*Primary Examiner* — Peter M Poon
*Assistant Examiner* — Shada Mohamed Alghailani
(74) *Attorney, Agent, or Firm* — Merchant & Gould P.C.

(57) ABSTRACT

A closure assembly system for attaching a foot protection to a horn capsule of an animal by means of attachment structure, which may be secured to a horn capsule wall of the horn capsule, and holding structure, which are secured to the foot protection, wherein the foot protection has a sole plate and at least two adaption elements each having at least one leg and a base plate, and wherein each leg is configured to be slidable essentially radially relative to the horn capsule wall by the base plate, which is configured to be slidable in a sole plate recess of the sole plate that is open towards the topside, and wherein each leg has one of the holding structures, each of which is configured to be connectable with the attachment structure in a sheer-resistant and detachable way.

16 Claims, 7 Drawing Sheets

(58) Field of Classification Search
USPC .......................... 54/82; 168/4, 12, 13, 17–21
See application file for complete search history.

(56) References Cited

U.S. PATENT DOCUMENTS

| | | | | |
|---|---|---|---|---|
| 1,351,769 | A * | 9/1920 | Leinweber | A01L 3/04 168/19 |
| 1,383,508 | A * | 7/1921 | Witushen | A01L 3/02 168/22 |
| 1,403,071 | A * | 1/1922 | Capewell | A01L 3/04 168/21 |
| 1,416,658 | A * | 5/1922 | Michelsen | A01L 3/04 168/19 |
| 1,496,511 | A * | 6/1924 | Allman | A01L 3/00 168/22 |
| 3,163,230 | A * | 12/1964 | Christensen | A01L 3/02 168/22 |
| 3,494,422 | A * | 2/1970 | Clark | A01L 5/00 168/4 |
| 4,513,824 | A * | 4/1985 | Ford | A01L 3/00 168/24 |
| 4,892,150 | A * | 1/1990 | Thoman | A01L 3/00 168/20 |
| 5,027,904 | A * | 7/1991 | Miller | A01L 7/04 168/4 |
| 5,172,766 | A * | 12/1992 | Adkins | A01L 5/00 168/14 |
| 5,692,569 | A | 12/1997 | Constantino et al. | |
| 5,842,523 | A * | 12/1998 | Stuebbe | A01L 5/00 168/4 |
| 6,571,881 | B1 * | 6/2003 | Nolan | A01L 7/00 168/12 |
| 8,151,545 | B1 * | 4/2012 | Ford | A01K 13/007 54/82 |
| 9,538,738 | B2 * | 1/2017 | Bergeleen | A01L 5/00 |
| 2004/0134045 | A1 * | 7/2004 | Poulakis | A44B 18/0049 24/442 |
| 2008/0264005 | A1 * | 10/2008 | Ford | A01L 3/00 54/82 |
| 2010/0031614 | A1 * | 2/2010 | Osborne | A01K 13/007 54/82 |
| 2012/0005995 | A1 * | 1/2012 | Emery | A01K 13/007 54/82 |
| 2012/0261143 | A1 * | 10/2012 | Craig | A01L 3/00 168/17 |
| 2014/0231100 | A1 * | 8/2014 | Ford | A01L 1/02 168/12 |
| 2014/0231101 | A1 * | 8/2014 | Ford | A01L 3/02 168/12 |
| 2015/0327531 | A1 * | 11/2015 | Hannover | A01L 1/04 168/10 |
| 2016/0037949 | A1 * | 2/2016 | Dawson | A47G 27/0418 428/95 |
| 2016/0044907 | A1 * | 2/2016 | Buchanan | A01L 3/04 168/1 |
| 2016/0157474 | A1 * | 6/2016 | Broadus | A01L 7/00 168/17 |
| 2016/0165871 | A1 * | 6/2016 | Ruetenik | A61D 9/00 168/22 |

FOREIGN PATENT DOCUMENTS

| | | |
|---|---|---|
| DE | 198 00 695 A1 | 6/1998 |
| DE | 103 46 480 A1 | 12/2004 |
| EP | 3 103 331 A1 | 12/2016 |
| WO | 2010/039901 A1 | 4/2010 |

OTHER PUBLICATIONS

Int'l Preliminary Report on Patentability (Ch. I of the PCT) for Int'l Pat. App. No. PCT/EP2017/060760, dated Nov. 13, 2018, 7 pgs.
Int'l Search Report and Written Opinion of the Int'l Searching Authority for Int'l Pat. Appln. No. PCT/EP2017/060760 dated Jul. 28, 2017, 13 pages.

* cited by examiner

FASTENING COMPOUND SYSTEM FOR A FOOT PROTECTOR

This application is a National Stage Application of PCT/EP2017/060760, filed 5 May 2017, which claims benefit of Ser. No. 16/169,307.2, filed 12 May 2016 in Europe, and which applications are incorporated herein by reference. To the extent appropriate, a claim of priority is made to each of the above-disclosed applications.

BACKGROUND OF THE INVENTION

The invention relates to a closure assembly system for attaching a foot protection to a horn capsule of an animal by means of attachment means, which may be secured to a horn capsule wall of the horn capsule, and holding means, which are secured to the foot protection.

Equidae such as, for example, horses or donkeys and even-toed ungulates, so-called cloven-hoofed animals such as cattle or sheep, have hooves or claws formed of horn capsules at the lowermost part of the limbs. Just like claws and fingernails, they are worn out by use and therefore regrow constantly. Since such animals are today usually kept as domestic or farm animals, they are frequently no longer able to act out their natural movement behaviour, whereby growth and abrasion of hooves and claws often no longer match. In order to prevent diseases of the hooves or claws, they must be trimmed at regular intervals, depending on the strain, and, if need be, provided with a foot protection when the horn capsule is heavily stressed.

Especially with equidae, which are increasingly moved on hard ground, for example on tarred roads, the attachment of a foot protection is widely used. For horse, donkey and mule, a metal horseshoe is thereby nailed in most cases, which, however, might entail significant disadvantages for the body of the animal due to the lack of shock absorption and a rigid fixation of the movable tactile organ "hoof". In addition, a hoof protection secured permanently for eight weeks by nailing has the disadvantage that the hoof horn, which regrows by two to four centimetres in the shoeing period, cannot rub off or be trimmed naturally so that the hoof increasing in circumference will remain fixed in its narrow initial position. This may lead to a faulty foot position and damage to bones, tendons and ligaments associated therewith.

Due to the shock-absorbing properties and the lower risk of injury, plastic shoes have increasingly been used in recent years, especially for horses used in leisure riding. A temporary nailless hoof protection permitting the natural movements of the hoof would be the ideal solution for preserving the animal's health. Solutions in the form of a shoe for hooves which can be strapped or glued on are already commercially available, with the disadvantage that, so far, they have had to be guided as far as over the fetlock joint, resulting in chafing and, due to the inaccurate adaptability, frequently in a loss of the hoof protection at faster gaits. The use of hoof shoes which are guided over the fetlock is not possible either in the sports sector, as they do not allow fast turning of the hooves on the ground at high speed.

A hoof shoe must be removed by the rider after the use of the animal, since the horse's leg sweats and rubs itself sore in the hoof shoe. For this reason, a hoof shoe should be limited exclusively to the attachment to the horn capsule and should be removable at any time on demand. In contrast, the hoof shoe should additionally be allowed to be left on the hoof for several days if necessary without running the risk of being lost or of chafe marks occurring.

Document DE 197 42 274 A1 discloses such a temporary hoof protection made of plastic, which is secured in the form of a hoof shoe to the horn capsule by means of a hook-and-loop fastener. A disadvantage of this hoof protection is the lack of adaptability to the hoof so that clearances between the hoof and the hoof protection occur, which is detrimental to the durability of the hoof protection on the hoof. Even if the hoof shoe is adapted precisely to the hoof shape of an individual animal, which would be very costly and expensive to buy and manufacture, the adaptation for this hoof protection is always only a snapshot, since the hoof grows and is thus in a permanent growth process. The document discloses a further hoof protection which is adaptable to the hoof of a horse to a certain degree. However, this hoof protection has turned out to be unreliable in practice.

SUMMARY OF THE INVENTION

The invention is based on the object of enabling a temporary foot protection for different hooves and claws, allowing a reliable connection between the foot protection and the horn capsule.

According to the invention, said object is achieved in that the foot protection has a sole plate and at least two adaption elements each having at least one leg and a base plate, wherein each leg is configured to be slidable essentially radially relative to the horn capsule wall by means of the base plate, which is configured to be slidable in a sole plate recess of the sole plate that is open towards the topside, and wherein each leg has one of the holding means, which are configured to be connectable with the attachment means in a sheer-resistant and detachable way.

In this way, the advantage is obtained that the foot protection can be adapted manually to a hoof or a claw quickly and easily as it is applied, whereby a shear-resistant and reliable connection between the foot protection and the horn capsule is formed immediately. Thereby, the connection between the attachment means and the horn capsule wall is configured to be stronger than the connection between the attachment means and the holding means. After use, the foot protection can be removed manually just as quickly and easily, while the attachment means may remain on the horn capsule.

Due to the reliable connection of the closure assembly system according to the invention, it becomes possible for the first time to attach a temporary foot protection precisely only to the horn capsule wall, preferably merely to a horn capsule side wall, of the hoof and to detach it therefrom. The adaption elements press the foot protection against the horn capsule so that advantageously a shear-resistant and detachable connection is rendered possible. In this connection, it is particularly advantageous that the attachment means for the horn capsule wall are attached to the horn capsule wall without damage. Thus, there is no penetration of a nail or a screw into the horn capsule wall, which would damage the horn capsule wall.

Advantageously, the holding means and/or the attachment means have a form-fit surface structure, preferably a surface structure according to 3M™ Dual Lock™, 3M™ DuoTec™ or VELCRO® Plastic Hooks. A form-fit connection between two such surfaces can be effected in a manually detachable way and, at the same time, has a particularly high shear strength.

Particularly advantageously, the holding means with such a surface structure are configured to be integral directly with a surface of the legs that is opposite to the attachment means.

In this way, the manufacture of the adaption elements is simplified and the holding means need not be applied specifically to the legs.

The holding means and/or the attachment means can advantageously also be composed of a tape, preferably a one-sided adhesive tape having the form-fit surface structure. As a result, the holding means and/or the attachment means can be replaced easily and quickly.

Particularly advantageously, the surface structure is configured as a micro-structure. Due to their special surface properties, micro-structures enable novel actions and effects, for example, particularly stable connections or self-cleaning surfaces.

In a further advantageous embodiment of a closure assembly system according to the invention, the holding means and the attachment means are configured as an engagement connection, preferably as a snap-fastener closure or as a pressure cap brace or in the form of a press-lock or closure buckle. Those engagement connections have the advantage that the connection can be prestressed so that even in case of animals with difficult foot-to-ground behaviour (rotation of the hoof) the foot protection remains snugly on the hoof.

In a further advantageous embodiment of a closure assembly system according to the invention, the holding means and the attachment means are configured as a detachable cable tie closure, wherein preferably the attachment means are configured as a cable tie head and the holding means as a cable tie tab. This provides the advantage that the connection can be prestressed so that even in case of animals with difficult foot-to-ground behaviour (rotation of the hoof) the foot protection remains snugly on the hoof.

In a further advantageous embodiment of a closure assembly system according to the invention, the holding means and the attachment means are secured to the leg, wherein the attachment means have a suction cup structure or micro-structure facing the horn capsule wall and configured to form a sheer-resistant and detachable connection with the horn capsule wall, wherein the connection between attachment means and holding means is stronger than the connection between attachment means and horn capsule wall. In this way, the advantage is obtained that no attachment means must remain on the horn capsule. Particularly advantageously, the holding means and the attachment means are configured to be integral with a surface of the legs that is opposite to the horn capsule wall.

Suitably, the base plate of the adjustment members is insertable/displaceable into/in the sole plate in such a way that the position of the legs of the adjustment members is variable with respect to the sole plate. Thus, in connected holding means, a sole plate projection of the sole plate with respect to the leg of the adjustment member(s) is advantageously formed in the area of at least a portion of the following sections of the horn capsule wall: inner horn capsule side wall; outer horn capsule side wall; inner heel wall; outer heel wall. In this way, injuries caused by a possible supination (outward rotation/tilting) or pronation (inward rotation/tilting), i.e., "tilting over or buckling" of a limb of the animal, in particular of the horse, on the horn capsule 13, are advantageously prevented, and the foot protection according to the invention is also suitable for orthopaedic use, whereby malpositions can be corrected.

Particularly advantageously, the adjustment members each have a base plate, via which base plate they are connected to the foot protection, wherein the base plate is configured to be detachable from the foot protection. As a result, different adjustment members may, for example, be exchanged with different holding means which are compatible with the respective attachment means in a form-fitting and/or different way, for example, in a non-positive and/or firmly bonded way. Furthermore, adjustment members or holding means, respectively, which are broken or are to be cleaned can be removed and/or replaced easily.

Advantageously, the adjustment members and/or the foot protection are made at least in part from metal, in particular stainless lightweight steel, or aluminium, rubber, plastics, fibre-reinforced plastics or carbon, which provides the foot protection with the necessary stability. For example, the shock-absorbing properties can be improved by a plastic sole, and carbon has a particularly high strength at a relatively low density.

In an advantageous advanced embodiment of a closure assembly system according to the invention, the legs of the adjustment members are bendably connected with the foot protection or the base plate of the adjustment members via a joint or a living hinge. As a result, the adjustment members and the holding means can be adapted to the horn capsule wall.

BRIEF DESCRIPTION OF THE DRAWINGS

In the following, the closure assembly system according to the invention is explained in further detail in a non-limiting manner on the basis of exemplary embodiments illustrated in the drawings.

FIG. 14 shows, in a view from behind, the foot protection according to FIG. 1 without horn capsule (FIG. 14A) and with horn capsule (FIG. 14B), wherein, for ease of illustration, not all adjustment members 9 are shown.

DETAILED DESCRIPTION OF THE PREFERRED EMBODIMENT

In the following, reference is made to FIGS. 1-5. A foot protection 1 according to the invention is provided, for example, as a protection against abrasion and injury of a horn capsule of equidae, such as, e.g., horses or donkeys and even-toed ungulates, so-called cloven-hoofed animals such as, e.g., cattle or sheep. For the sake of simplicity, however, only the term "hoof" and all terms combined therewith, such as, e.g., "hoof sole", etc., will be used hereinbelow. In such cases, however, hooves and claws are always referred to. Furthermore, the term "hoof" is partly used as a substitute for the term "horn capsule", or vice versa, respectively.

The foot protection 1 has a sole plate 2. For reducing the dead weight, the sole plate 2 may have a recess 3. The sole plate 2 has an outsole 4 on its lower side facing away from the horn capsule in the applied state of the foot protection 1. The foot protection 1 has a toe protection 5 in its front area.

Figure 10:
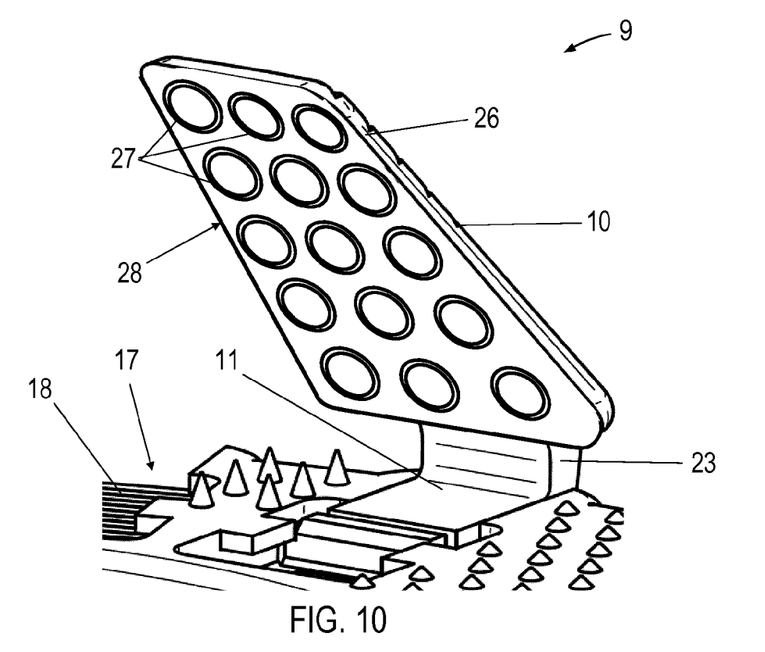
FIG. 10 shows, in accordance with FIG. 7, a detail of a foot protection according to a further embodiment of the invention.
Figure 11:
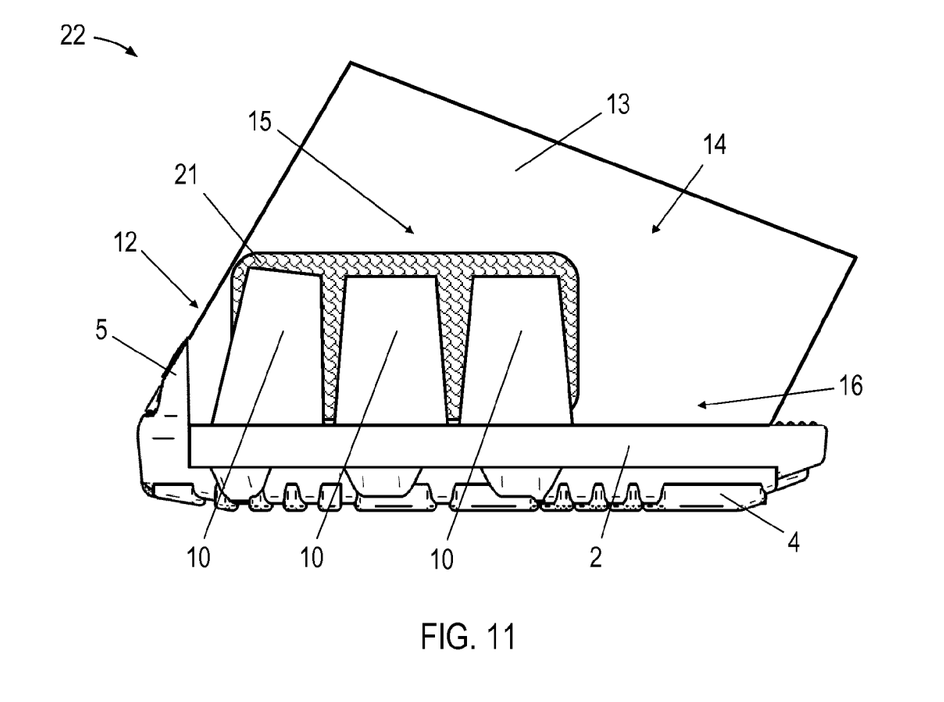
FIG. 11 schematically shows a closure assembly system according to the invention as per the first embodiment of the invention.
Figure 12:
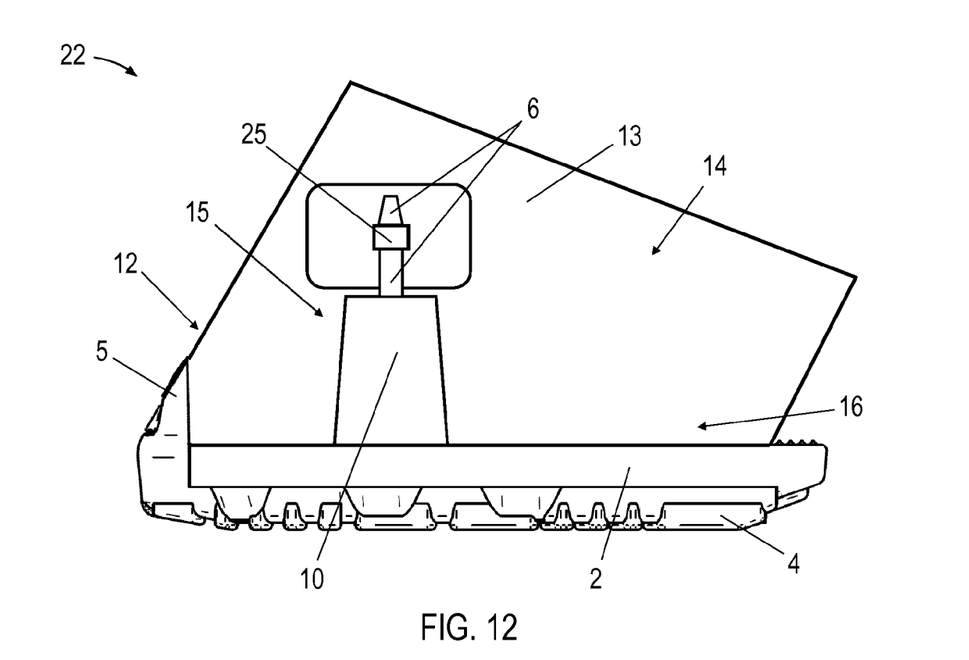
FIG. 12 schematically shows a closure assembly system according to the invention as per the second embodiment of the invention.

According to FIGS. 10-11, the toe protection 5 ends up lying at or near a toe wall 12 of the horn capsule 13 in the applied state of the foot protection 1. Furthermore, a horn capsule wall 14 of the horn capsule 13 can be divided into a horn capsule side wall 15 and a heel wall 16. A person skilled in the related state of the art is familiar with those terms and divisions.

In the present first embodiment, the sole plate 2 exhibits, in some areas, conical nubs on its side facing the horn capsule in the applied state of the foot protection 1, the nubs improving the adhesion of the foot protection 1 and the horn capsule in the applied state of the foot protection 1. For adjusting the flexibility of the foot protection 1 in the movable part of the heels of the hoof, a so-called "spacer" 19 in different degrees of hardness is insertable in the rear region of the sole plate 2. Thus, the flexibility of the foot protection 1 can be adapted individually to the needs of the animal.

The foot protection 1 comprises six adjustment members 9. Each adjustment member 9 has at least one leg 10 and a base plate 11. The leg 10 is connected to the base plate 11 via a living hinge 23. The living hinge 23 is formed of several weakening lines introduced into the material, thus allowing a flexible adjustment of the leg 10 relative to the horn capsule wall 14 as well as simplified pressing against and detaching from the horn capsule wall 14. Alternatively, the leg 10 and the base plate 11 may also be connected via a joint, whereby the leg would be rotatable about the hinge axis.

Figure 1:
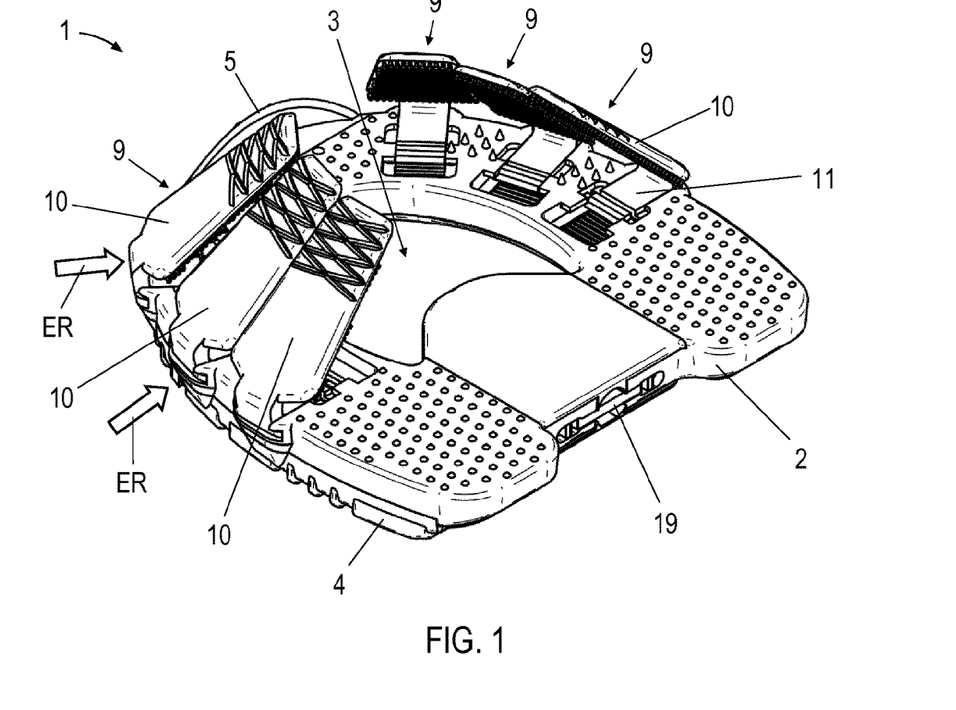
FIG. 1 shows a foot protection according to a first embodiment of the invention in a perspective view from above.
Figure 2:
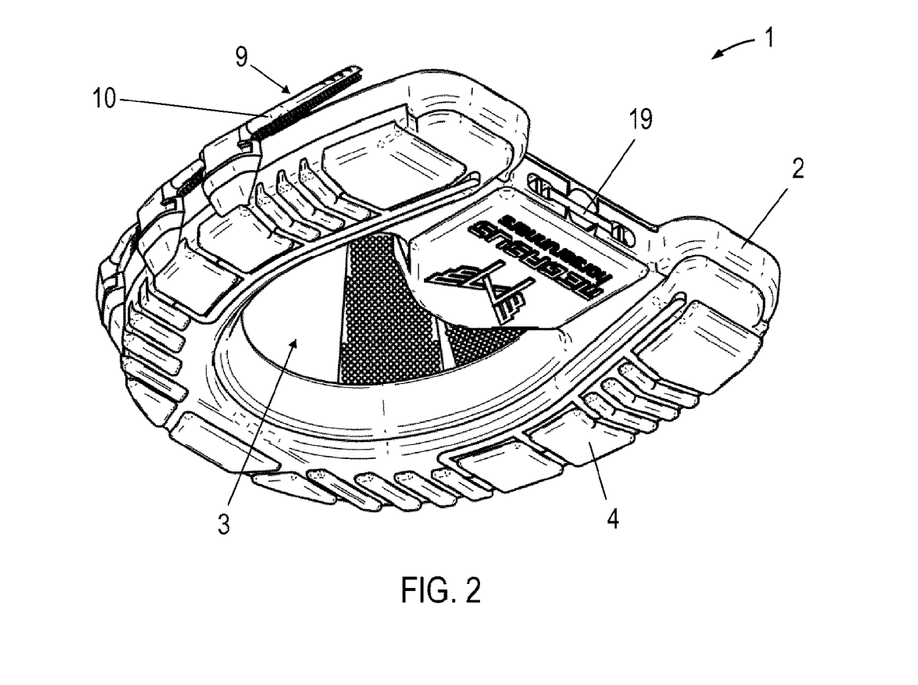
FIG. 2 shows the foot protection according to FIG. 1 in a perspective view from below.
Figure 3:
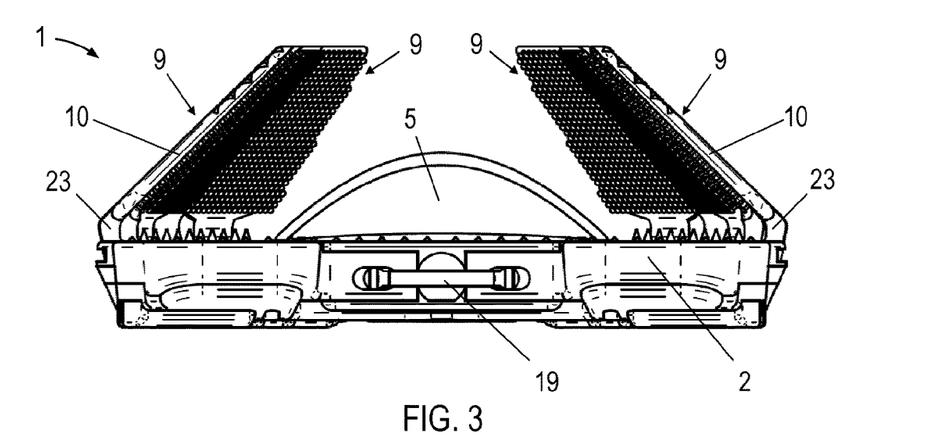
FIG. 3 shows the foot protection according to FIG. 1 in a view from behind.
Figure 4:
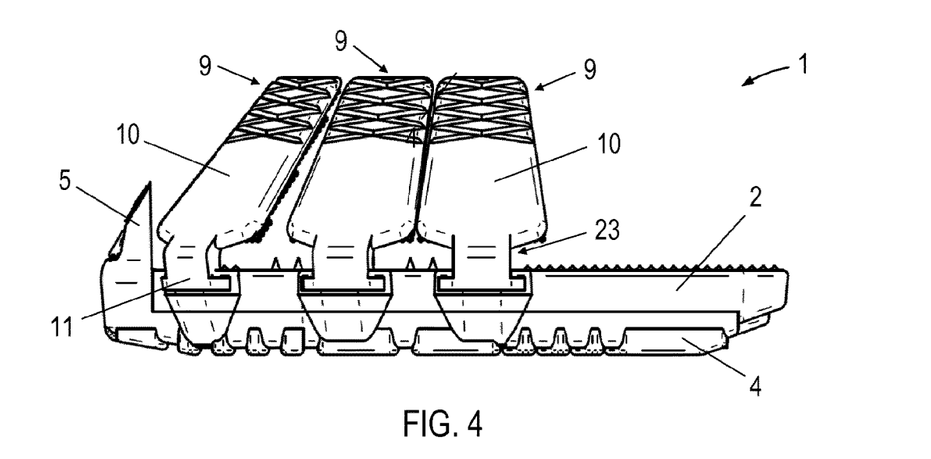
FIG. 4 shows the foot protection according to FIG. 1 in a side view.
Figure 5:
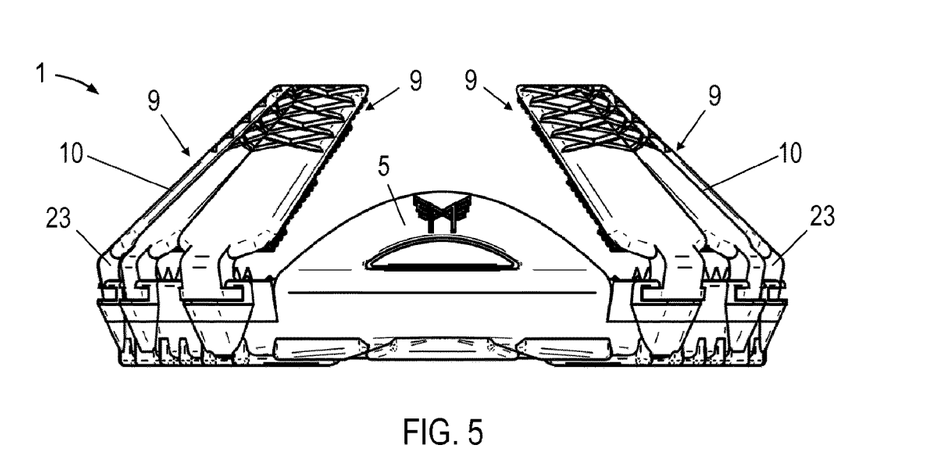
FIG. 5 shows the foot protection according to FIG. 1 in a view from the front.
Figure 6:
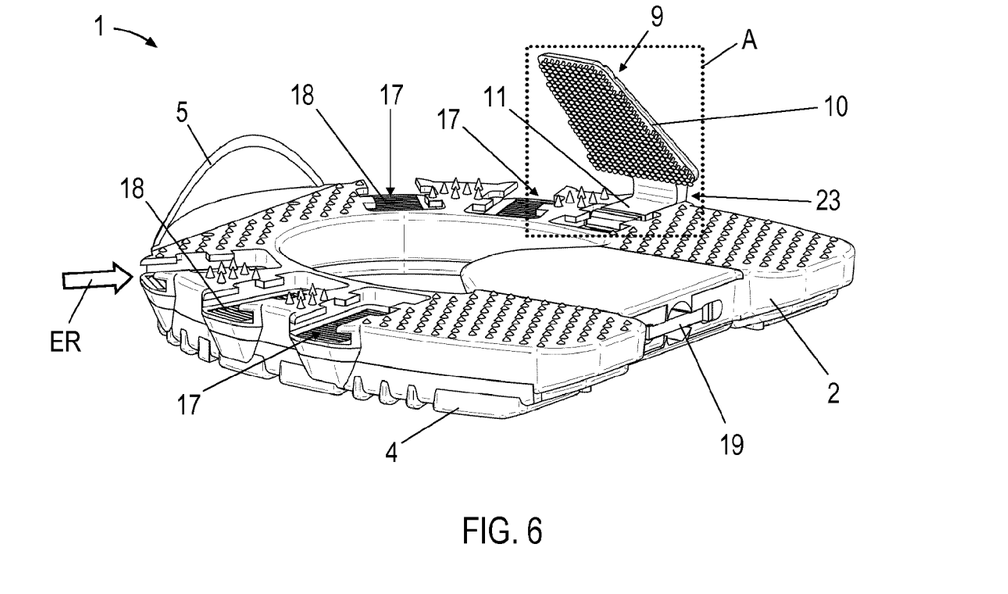
FIG. 6 shows the foot protection according to FIG. 1 in a perspective view from above, with five of the six adjustment members being loosened and removed.
Figure 7:
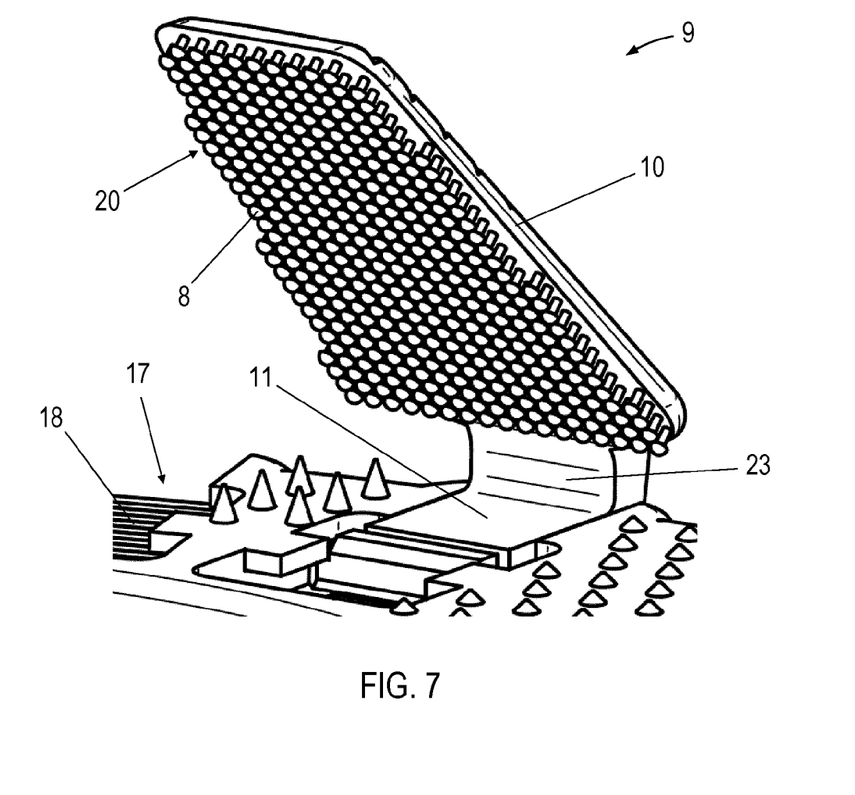
FIG. 7 shows a detail A of FIG. 6 in an enlarged perspective view.

Via the base plate 11, each adjustment member 9 is connected to the sole plate 2. For that, the base plate 11 is configured to be slidable essentially radially relative to the horn capsule wall 14 of the horn capsule 13, whereby the legs 10 are adjustable relative to the horn capsule wall 14. The base plate 11 is thereby configured to be insertable into and withdrawable from a sole plate recess 17 of the sole plate 2 along an insertion direction ER running essentially radially to the horn capsule wall 14. FIG. 6 illustrates this in further detail, wherein one of the six adjustment members 9 is depicted as being inserted and five are depicted as being removed. FIG. 7 illustrates the inserted adjustment member 9 in an enlarged view according to a detail A of FIG. 6. Alternatively, the base plates 11 of the adjustment members 9 may also be configured to form one piece with the sole plate 2. The essentially radial adaptability of the legs 10 relative to the horn capsule wall 14 would then be realized, for example, via an elongated, partially foldable living hinge or the like.

The base plate 11 and the sole plate 2 each have complementary surface structures 18, in particular sawtooth structures, which form a resistance against the insertion direction ER, on the surfaces which contact each other.

Each leg 10 comprises holding means 8. Those holding means 8 are integrated directly into a surface 20 of the leg 10. This surface 20 faces the horn capsule wall 14 in the applied state of the foot protection 1. Now, if attachment means 21 are secured to the horn capsule wall 14, the holding means 8 and the attachment means 21 are located opposite from each other and can be connected to each other in the applied state of the foot protection 1.

The adjustment members 9, which comprise the holding means 8 on the legs 10, and the attachment means 21, which can be secured to the horn capsule wall 14, thus form the closure assembly system 22 according to the invention for attaching the foot protection 1 to the horn capsule 13.

According to the first embodiment of the closure assembly system 22, the holding means 8 comprise a mushroom head-like surface structure according to FIG. 7. Such a surface structure is commercially available and is sold, for example, by the company "3M™" under the brand names "Dual Lock™" and "DuoTec™". The attachment means 21 exhibit the same mushroom head-like surface structure. In this way, a form-fit connection can be produced by sticking together the holding means 8 and the attachment means 21 manually or with the aid of a tool, for example, a plastic roller. This connection exhibits a particularly high shear strength and can be disengaged manually with relatively little effort essentially normally to the horn capsule wall 14. The company "VELCRO" offers a similar structure, namely a hook- and loop-like surface structure, under the brand name "Plastic Hooks".

Because of this connection, it is possible to secure the attachment means 21 exclusively to the horn capsule side wall 15 rather than also to the heel wall 16 and the toe wall 12, which is beneficial for the animal and the user. Alternatively, the attachment means 21 may additionally or exclusively also be secured to the toe wall 12, the heel wall 16 and/or any other part of the horn capsule wall 14. The fixation of the attachment means 21 or the foot protection 1, respectively, can thus be adjusted according to the hoof shape of the animal, the application of the foot protection 1 or depending on the number and design of the adjustment members 9.

Figure 14A:
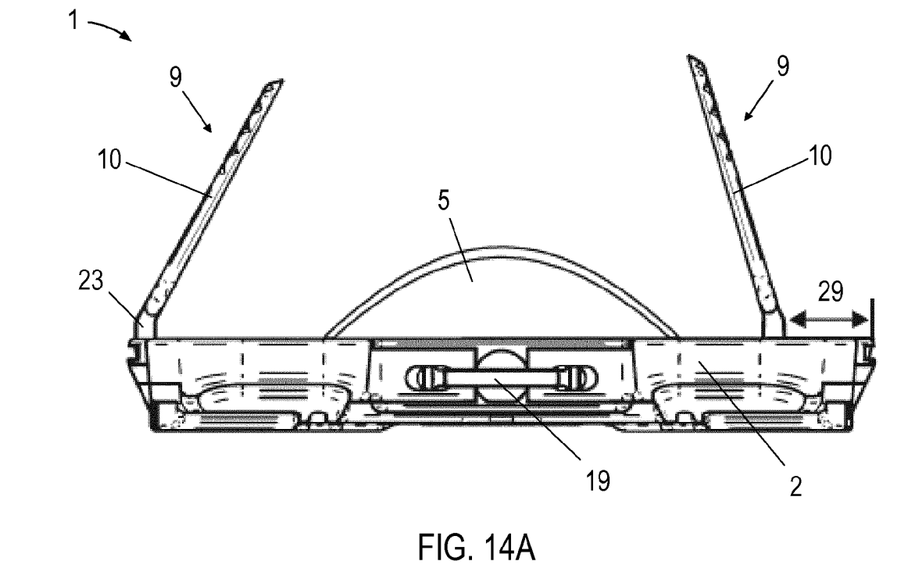
Figure 14B:
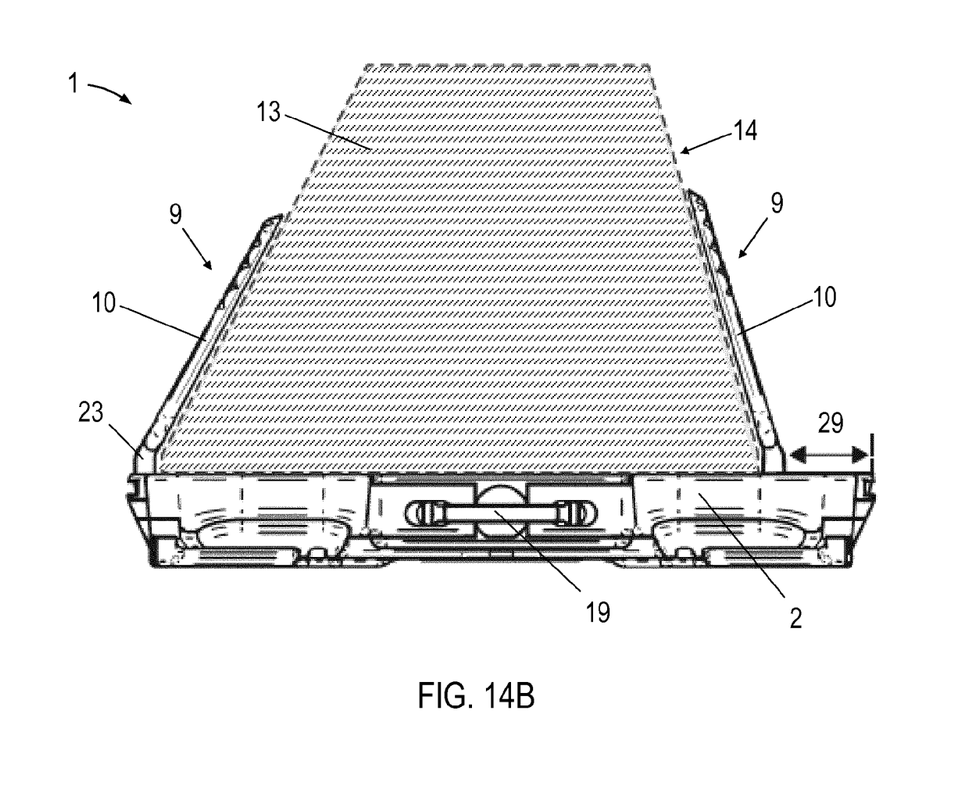

Due to the insertability or displaceability according to the invention of the base plate 11 into or, respectively, in the sole plate recess 17 of the sole plate 2, a sole plate projection 29 of the sole plate 2 with respect to the leg 10 of the inserted adjustment member(s) 9 can additionally be provided. This is shown in FIG. 14, wherein the foot protection 1 is illustrated without horn capsule 13 in FIG. 14A, and the foot protection 1 is illustrated with horn capsule 13 in FIG. 14B. If the sole plate 2 is chosen to be larger than the horn sole of the horn capsule, in holding means 8 connected with the attachment means 21, a sole plate projection 29 with respect to the leg 10 adapted to the horn capsule wall 14, or, respectively, with respect to the horn capsule wall 14, is formed in any place where the base plate 11 of an adjustment member 9 is inserted accordingly into the sole plate recess 17 of the sole plate 2. Advantageously, this sole plate projection 29 is formed in the area of at least a portion of the horn capsule side wall 14, in particular of the inner horn capsule side wall 15, of the outer horn capsule side wall 15, of the inner heel wall 16 and/or of the outer heel wall 16. In this context, "inner" means "lateral", and "outer" means "medial" in this respect. In this way, injuries caused by a possible supination (outward rotation/tilting) or pronation (inward rotation/tilting), i.e., "tilting over or buckling" of a limb of the animal, in particular of the horse, on the horn capsule 13, are advantageously prevented. As a result, the foot protection 1 according to the invention is also suitable for orthopaedic use, whereby malpositions can be corrected.

The attachment means 21 may, for example, be configured as a one-sided adhesive tape which exhibits the form-fit surface structure on the side not comprising the adhesive. The adhesive tape is then glued to the horn capsule wall 14 or the horn capsule side wall 15, respectively, with the side comprising the adhesive.

Alternatively, the mushroom head-like surface structure of the holding means 8 and the attachment means 21 may also be configured as a micro-structure, e.g., in the form of a "gecko tape". Furthermore, the surface structure of the holding means 8 and the attachment means 21 may be configured as hooks and loops or as "Metallic Velcro" made of spring steel.

A typical method of securing the foot protection 1 with the closure assembly system 22 according to the invention may be as follows: A foot protection 1 is chosen which is slightly larger than the hoof of the animal, for example having a diameter of about 13 centimetres.

The foot protection 1 is then held against the horn capsule 13 and optionally reduced to the actual size of the hoof. In a following step, the hoof is cleaned with alcohol, and the attachment means 21 are secured, for example glued, to the horn capsule wall 14. Then, the foot protection 1 is held against the horn capsule 13, and the adjustment members 9 are pushed manually toward the horn capsule wall 14. Once the holding means 8 are accurately aligned relative to the attachment means 21 to a sufficient degree, the mushroom head-like surface structure of the holding means 8 is pressed manually or by means of a plastic roller into the mushroom head-like surface structure of the attachment means 21, and the sheer-resistant connection is thus produced. After use, the foot protection 1 can easily be removed from the hoof manually, whereby the holding means 8 are withdrawn from the attachment means 21.

Figure 8:
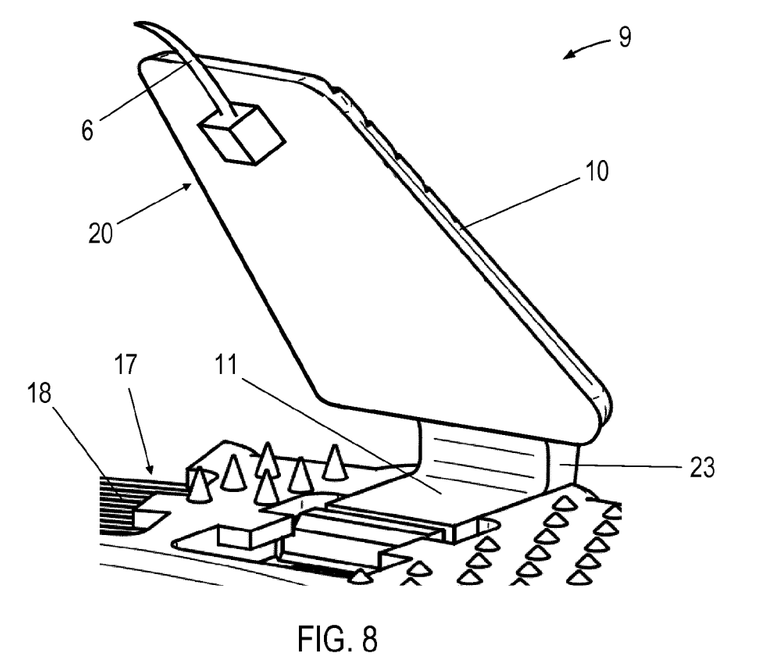
FIG. 8 shows, in accordance with FIG. 7, a detail of a foot protection according to a second embodiment of the invention.

FIG. 8 and FIG. 11 show, in accordance with FIGS. 7 and 11, an adjustment member 9 with holding means 6 according to a second embodiment of the invention. In this case, the holding means 6 and the attachment means 25 are configured as a detachable cable tie closure, wherein the attachment means 25 are configured as a cable tie head and the holding means as a cable tie tab. The cable tie tab is simply inserted manually into the cable tie head and tightened during the application of the foot protection 1. The cable tie head may be glued to the horn capsule wall 14 or integrated into a fabric tape glued to the horn capsule wall 14. An advantage of this design is the possibility of prestressing, which may reduce the clearance between the horn capsule wall 14 and the foot protection 1 even further and may be important for animals with a rotating foot-to-ground behaviour.

Alternatively, the cable tie tab may also form the attachment means 25 glued, for example, to the horn capsule wall 14. The adjustment members 9 may exhibit a cable tie head which is integrated into the leg 10 and through which the cable tie tab is pulled.

Figure 9:
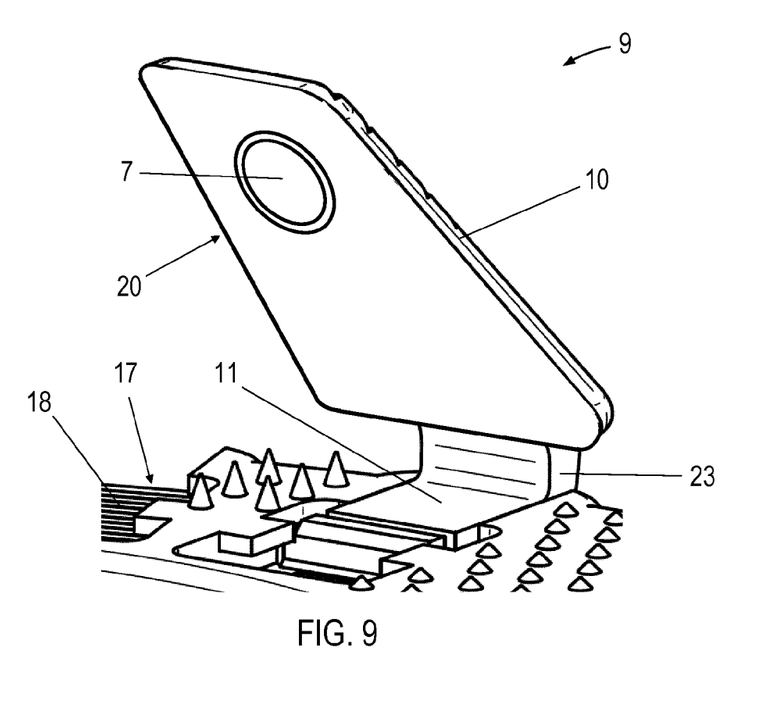
FIG. 9 shows, in accordance with FIG. 7, a detail of a foot protection according to a third embodiment of the invention.

FIG. 9 shows, in accordance with FIG. 7, an adjustment member 9 with holding means 7 according to a third embodiment of the invention. In this case, the holding means 7 and the attachment means are configured as a snap-fastener closure. During the application of the foot protection 1, the snap fastener forming the holding means 7 is simply pressed manually into the counterpart of the snap fastener, which, as the attachment means, is attachable to the horn capsule wall 14.

Figure 13:
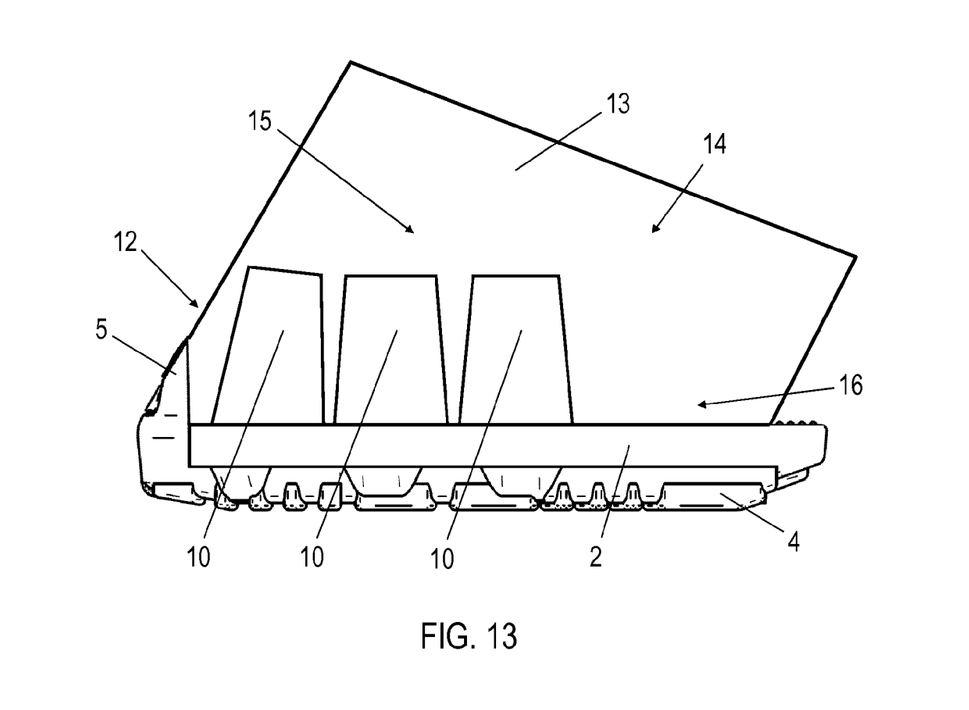
FIG. 13 schematically shows a closure assembly system according to the invention as per the further embodiment of the invention.

FIG. 10 and FIG. 13 show, in accordance with FIGS. 7 and 11, an adjustment member 9 with holding means 26 and attachment means 27 which both are secured to the leg 10, with the holding means 26 and the attachment means 27 being integrated into a surface 28 of the leg 10 which is opposite to the horn capsule wall 14. The holding means 26 and the attachment means 27 may thereby be applied to the leg 10 in the form of a layered assembly system. The holding means 26 may, for example, be configured as a one-sided adhesive tape which exhibits the form-fit surface structure on the side not comprising the adhesive. The adhesive tape is then glued to the leg 10 with the side comprising the adhesive and is connected to the attachment means 27 exhibiting a compatible surface structure on the side facing the holding means 26. In addition, the attachment means 27 exhibit a suction cup structure facing the horn capsule wall 14. Said suction cup structure is configured to form sheer-resistant and detachable connection with the horn capsule wall 14 by means of a negative pressure. As a result, the attachment means 27 can be attached directly to the horn capsule wall 14. In this case, the attachment means 27 are not required to remain on the horn capsule 13 after the hoof protection 1 has been removed. It is crucial for this design that the connection between the attachment means 27 and the holding means 26 is stronger than the connection between the attachment means 27 and the horn capsule wall 14 so that the attachment means 27 can be detached from the horn capsule 13 without difficulty.

Alternatively, the attachment means 27 and the holding means 26 may also be firmly glued together or even formed in one piece, since the hoof protection 1 is, again in this case, configured to be connectable in a detachable way, and, hence, the technical effect of the invention is not impaired. Alternatively, the attachment means 27 have a micro-structure, for example, a gecko structure, which faces the horn capsule wall 14 and is configured to form a sheer-resistant and detachable connection with the horn capsule wall 14.

Advantageously, the sole plate 2 is made of a particularly resistant, hard material of low density, for example aluminium, plastics such as, e.g., polyethylene (PE) or polypropylene (PP), particularly advantageously of a particularly resistant, hard material of particularly low density, for example carbon.

Advantageously, the outsole 4 is made of a resistant material with good shock-absorbing properties, for example plastics such as, e.g., ethylene vinyl acetate (EVA), or rubber.

Advantageously, the toe protection 5 can be used for safety purposes, for example using an attached light-reflecting passive reflector element, for information purposes, for example using an attached name of the animal or a code number, or for marketing purposes, for example using an attached emblem.

Advantageously, the holding means 8 can, in addition, also be connected positively to the attachment means 21 by applying an additional force acting essentially radially on the horn capsule wall 14. An additional screw connection may, for example, serve for this purpose.

In all embodiments of the invention, the attachment means for the horn capsule wall can be attached to the horn capsule wall without damage. Thus, there is no penetration of a nail or a screw into the horn capsule wall, which would damage the horn capsule wall. This improves the durability and health of the animals with regard to their hooves or claws.

The invention claimed is:

1. An assembly for protecting a hoof, comprising:
a foot protection including a holding structure; and
an attachment structure configured to be detachably secured to a horn capsule wall of a horn capsule and the holding structure of the foot protection,
the foot protection further including:
   a sole plate and at least two adaption elements, each adaption element having a leg and a base plate, wherein the leg is bendably connected to the base plate via a living hinge and configured to be slidable essentially radially relative to the horn capsule wall of the horn capsule by the base plate, the base plate being configured to be slidable in a sole plate recess of the sole plate open towards a topside and to be detachable from the sole plate, the base plate and the sole plate each having complementary surface structures forming a resistance against an insertion direction of the base plate, and wherein the leg has the holding structure,
   the holding structure being configured to be connectable with the attachment structure in a sheer-resistant and detachable way, wherein the holding structure and the attachment structure each has a mushroom head shaped surface structure, and a form-fit connection is produced by sticking together the holding structure and the attachment structure.

2. The assembly according to claim 1, wherein the holding structure is configured to be integral with a surface of the leg that is opposite to the attachment structure.

3. The assembly according to claim 1, wherein the mushroom head shaped surface structure is configured as a micro-structure.

4. The assembly according to claim 1, wherein the adaption elements and the foot protection are made at least in part from at least one of metal, rubber, plastics, fibre-reinforced plastics or carbon.

5. The assembly according to claim 1, wherein, when the holding structure is connected to the attachment structure, a sole plate projection of the sole plate with respect to the leg is formed in an area of at least a portion of the following sections of the horn capsule wall: an inner horn capsule side wall; an outer horn capsule side wall; an inner heel wall; and an outer heel wall.

6. An assembly for protecting a hoof, comprising:
a foot protection including a holding structure; and
an attachment structure configured to be detachably secured to a horn capsule wall of a horn capsule and the holding structure of the foot protection,
the foot protection further including:
   a sole plate and at least two adaption elements, each adaption element having a leg and a base plate, wherein the leg is bendably connected to the base plate via a living hinge and configured to be slidable essentially radially relative to the horn capsule wall of the horn capsule by the base plate, the base plate being configured to be slidable in a sole plate recess of the sole plate open towards a topside and to be detachable from the sole plate, the base plate and the sole plate each having complementary surface structures forming a resistance against an insertion direction of the base plate, and wherein the leg has the holding structure,
   the holding structure being configured to be connectable with the attachment structure in a sheer-resistant and detachable way, wherein the holding structure and the attachment structure each has a hook and loop shaped surface structure, a form-fit connection is produced by sticking together the holding structure and the attachment structure.

7. An assembly for protecting a hoof, comprising:
a foot protection including a holding structure; and
an attachment structure configured to be detachably secured to a horn capsule wall of a horn capsule and the holding structure of the foot protection,
the foot protection further including:
   a sole plate and at least two adaption elements, each adaption element having a leg and a base plate, wherein the leg is bendably connected to the base plate via a living hinge and configured to be slidable essentially radially relative to the horn capsule wall of the horn capsule by the base plate, the base plate being configured to be slidable in a sole plate recess of the sole plate open towards a topside and to be detachable from the sole plate, the base plate and the sole plate each having complementary surface structures forming a resistance against an insertion direction of the base plate, and wherein the leg has the holding structure,
   the holding structure being configured to be connectable with the attachment structure in a sheer-resistant and detachable way, wherein the holding structure and the attachment structure each has a surface structure configured as a micro-structure, form-fit connection is produced by sticking together the holding structure and the attachment structure.

8. The assembly according to claim 1, wherein:
the base plate is constructed to have an upper side that is substantially flat, and
the adaption elements are configured to be manually pushed toward the horn capsule when the foot protection is held against the horn capsule.

9. The assembly according to claim 6, wherein:
the base plate is constructed to have an upper side that is substantially flat, and
the adaption elements are configured to be manually pushed toward the horn capsule when the foot protection is held against the horn capsule.

10. The assembly according to claim 6, wherein the holding structure is configured to be integral with a surface of the leg that is opposite to the attachment structure.

11. The assembly according to claim 6, wherein the adaption elements and the foot protection are made at least in part from at least one of metal, rubber, plastics, fibre-reinforced plastics or carbon.

12. The assembly according to claim 6, wherein, when the holding structure is connected to the attachment structure, a sole plate projection of the sole plate with respect to the leg is formed in an area of at least a portion of the following sections of the horn capsule wall: an inner horn capsule side wall; an outer horn capsule side wall; an inner heel wall; and an outer heel wall.

13. The assembly according to claim 7, wherein:
the base plate is constructed to have an upper side that is substantially flat, and
the adaption elements are configured to be manually pushed toward the horn capsule when the foot protection is held against the horn capsule.

14. The assembly according to claim 7, wherein the holding structure is configured to be integral with a surface of the leg that is opposite to the attachment structure.

15. The assembly according to claim 7, wherein the adaption elements and the foot protection are made at least in part from at least one of metal, rubber, plastics, fibre-reinforced plastics or carbon.

16. The assembly according to claim 7, wherein, when the holding structure is connected to the attachment structure, a sole plate projection of the sole plate with respect to the leg is formed in an area of at least a portion of the following sections of the horn capsule wall: an inner horn capsule side wall; an outer horn capsule side wall; an inner heel wall; and an outer heel wall.

* * * * *